United States Patent
Wesley

(10) Patent No.: US 8,783,561 B2
(45) Date of Patent: Jul. 22, 2014

(54) SYSTEM AND METHOD FOR ADMINISTERING A LOYALTY PROGRAM AND PROCESSING PAYMENTS

(75) Inventor: Robert J. Wesley, Wellesley, MA (US)

(73) Assignee: Modiv Media, Inc., Quincy, MA (US)

( * ) Notice: Subject to any disclaimer, the term of this patent is extended or adjusted under 35 U.S.C. 154(b) by 940 days.

(21) Appl. No.: 11/486,707

(22) Filed: Jul. 14, 2006

(65) Prior Publication Data

US 2008/0011837 A1    Jan. 17, 2008

(51) Int. Cl.
*G06K 5/00* (2006.01)

(52) U.S. Cl.
USPC ........ 235/380; 235/379; 705/14.1; 705/14.17

(58) Field of Classification Search
USPC ........................................................ 235/379
See application file for complete search history.

(56) References Cited

U.S. PATENT DOCUMENTS

| | | | | |
|---|---|---|---|---|
| 7,506,804 | B2 * | 3/2009 | Zajkowski et al. | 235/380 |
| 2002/0062249 | A1 * | 5/2002 | Iannacci | 705/14 |
| 2002/0143655 | A1 * | 10/2002 | Elston et al. | 705/26 |
| 2003/0229541 | A1 * | 12/2003 | Randall et al. | 705/14 |
| 2005/0021401 | A1 * | 1/2005 | Postrel | 705/14 |
| 2005/0216354 | A1 * | 9/2005 | Bam et al. | 705/26 |
| 2006/0000900 | A1 * | 1/2006 | Fernandes et al. | 235/380 |
| 2006/0020507 | A1 | 1/2006 | Sagey | |
| 2006/0059040 | A1 * | 3/2006 | Eldred et al. | 705/14 |
| 2006/0091203 | A1 | 5/2006 | Bakker et al. | |

OTHER PUBLICATIONS

International Search Report and Written Opinion issued for PCT application PCT/US2007/072757; Dated: Jan. 28, 2008; 10 Pages.
U.S. Appl. No. 10/646,579, filed Aug. 22, 2003, Bam et al.
U.S. Appl. No. 10/877,093, filed Jun. 25, 2004, Bam et al.
U.S. Appl. No. 10/691,459, filed Oct. 22, 2003, Bam et al.

* cited by examiner

*Primary Examiner* — Christopher Stanford
(74) *Attorney, Agent, or Firm* — Pillsbury Winthrop Shaw Pittman LLP

(57) ABSTRACT

The present invention is directed to a system and method for administration of a customer loyalty program at a point of sale terminal. The system, in one embodiment, contains a database of customer records for the loyalty program where each customer record contains information about a customer's payment device and information about a customer's mobile device. The system may locate a customer record in a database based on payment device or mobile device information captured at the point of sale terminal and apply any applicable loyalty program discounts. The system may then forward the payment device information to a third-party payment processor for payment processing. The system may print out a receipt at the point of sale terminal indicating any discounts and containing a promotional message. The system may also send a promotional message to the customer's mobile device using the mobile device information stored in the customer's record.

33 Claims, 8 Drawing Sheets

SYSTEM AND METHOD FOR ADMINISTERING A LOYALTY PROGRAM AND PROCESSING PAYMENTS

CROSS-REFERENCE TO RELATED APPLICATIONS

The present invention relates to co-pending, and commonly assigned U.S. patent application Ser. No. 10/646,579, filed Aug. 22, 2003, entitled "SYSTEM AND METHOD OF INTEGRATING LOYALTY/REWARD PROGRAMS WITH PAYMENT IDENTIFICATION SYSTEMS," the disclosure of which is hereby incorporated by reference. The present invention also relates to co-pending, and commonly assigned U.S. patent application Ser. No. 10/877,093, filed Jun. 25, 2004, entitled "A SYSTEM AND METHOD OF ALERTING USERS TO OFFERS USING ELECTRONIC DEVICES," which is a continuation-in-part of U.S. patent application Ser. No. 10/691,459, filed Oct. 22, 2003, entitled "A SYSTEM AND METHOD OF GENERATING, DISTRIBUTING, AND/OR REDEEMING PROMOTIONAL OFFERS USING ELECTRONIC DEVICES," the disclosures of which are hereby incorporated by reference.

TECHNICAL FIELD

The present invention relates to the management, enrollment, and redemption aspects of a loyalty program using a point of sale (POS) terminal, a program management system, and a customer's mobile device.

BACKGROUND OF THE INVENTION

As societies have become more and more mobile, people have found it convenient, and usually mandatory, to carry on their person several items of critical importance. One of these items is a form of payment for goods and services. Another of these items is a form of identity.

Before the concept of government sponsored currency came into vogue, people carried with them different forms of valuable commodities, such as gold, silver, and diamonds. In some societies even beads were popular. With the advent of "official" currency, coins, usually with a ruler's picture imprinted on one surface, were lugged around in sacks or purses. In every transaction, the seller of goods or services needed to make sure of the authenticity of the payment. Usually this was based on verification of the validity of the payment by weighing or measuring, and often depended heavily upon the identification (and known or provable veracity) of the buyer.

Paper money issued by a reliable government solved many of the problems traditionally inherent with commercial transactions. Using such money, the identity of the payor is not critical so long as the authenticity of the currency is validated. For the past few decades this has again been changing, as credit cards, debit cards, stored value cards, and other forms of non-cash payment have taken hold. Concurrent with a change in payment method, there has been an increase in the need for personal identification, both for the payment of goods and services and for the purpose of identification for other purposes. These other purposes include verification of group membership, such as entitlement to discounts, admission to museums, medical benefit entitlements, proof of car insurance, proof of valid licenses, and the like.

Thus, the purse, or now more commonly the wallet, which at first served to lug around valuable and often heavy objects for bartering, now carries several forms of personal papers, usually in the form of plastic cards bearing magnetic identification strips. The wallet now carries different pieces of information and service provider information, such as identification cards, payment cards, loyalty cards, affinity cards, drivers licenses, coupons, and more. Key chains are also being used to carry tags containing these pieces of information.

Each of these cards enables specific services. For example, a credit card serves the function of providing the user credit for a purchase but does not serve the function of allowing the card to be used for debit purposes or for group identification, or for indicating that the holder has a valid license, or has valid insurance. Moreover, the information that is stored on these cards is permanent and cannot easily be changed at the will of either the issuer or the borrower. The wallet has again grown heavier as the number of identification cards has increased.

Many stores also have their own affinity, loyalty or rewards programs, such as a Stop & Shop card, a CVS pharmacy card or a AAA card, which are programs operationally separate from the payment cards. This offers the additional inconvenience of needing to carry additional cards and requires a user to swipe two different cards at a point of sale; one card for discount/rewards/identification, and one card for payment, and perhaps a third card just to enter the facility. Other stores have started to issue stored value cards for purchases, gifts, promotions, and returns. One use of such stored value cards occurs when a merchant records one or more transactions on a customer's card and then, after a certain number of transactions (or transaction amounts) have been entered, the customer is awarded a gift, or a discount, or some other item of value. These cards are being used to build customer loyalty and attract new customers.

Given a choice of similar providers, consumers tend to patronize the merchant that provides the consumer more value for the same price, or the same value at a lower price. To influence a consumer's choice of providers, merchants often provide promotions, such as coupons, for goods such as groceries, consumer electronics, clothing, and other items that may be purchased in person, over the phone, or electronically. In this context, a coupon is a promotion used as a tool by merchants to encourage sales and/or loyalty, usually by lowering the price in some manner. For example, a coupon could be used for a discount on the product, to give the consumer a larger quantity (for example, 2 for 1) of a product or service, or a discount on a related product or future purchase. A coupon could also be used to credit purchases made by one person against a certain account. Thus, a school could get credits (money or otherwise) for purchases made by any one of a number of people having an affinity toward the school (affinity groups). The possibilities for coupon usage are essentially unlimited.

Coupons and other promotions are often used by merchants as marketing tools designed and developed to encourage a change in purchase behavior, retain valued customers and to induce repeat purchases. Traditional promotions have been paper and/or plastic card-based, and usually have a cash or material purchase value, such as prepaid gift cards. Rather than being directed toward a single product, the promotions may be an incentive to buy accessories associated with a particular item, or promotions may even be offers to sell. Overall, promotions serve to attract consumers to a store or to a particular product or brand in a store, as well as to bring attention to new products and keep track of an individual consumer's buying habits.

BRIEF SUMMARY OF THE INVENTION

The present invention is directed to a system and method for administering a customer loyalty program and processing payments using a point of sale (POS) terminal and a processing platform. Embodiments of the invention allow a customer to both pay for a transaction and participate in a loyalty program using a single payment device at a POS terminal. In one embodiment, the customer may use a credit card not associated with the merchant to pay for goods at a POS terminal. The POS terminal may capture swipe data from the credit card. The POS terminal may then transmit transaction information such as the captured payment device identification information and a total amount due for the transaction to the processing platform. In some embodiments, the processing platform is located at a remote location from the point of sale terminal and one processing platform may communicate with a number of POS terminals. The processing platform may search a database of stored customer records to locate a customer record associated with the transmitted payment device identification information. In addition to payment device identification information, the customer record may contain mobile device identification information and loyalty program data. In another embodiment the POS terminal may capture mobile device identification in addition to or in alternative to capturing the payment device identification information discussed above. The system may then locate a customer record based on the mobile device identification information.

When the processing platform locates a customer record containing the transmitted payment device identification information and/or mobile device identification information, the processing platform may process loyalty program data associated with the located customer record such as accrued discounts and apply any discounts to the amount due to create an adjusted amount due. In some embodiments, a coupon server within the processing platform may perform this processing. The processing platform may then transmit this adjusted amount due to a third party payment processor. Upon confirmation from the third party payment processor, the processing platform may transmit a confirmation message to the POS terminal. In another embodiment, the adjusted amount due may be transmitted back to the POS terminal for payment processing. The POS terminal may then accept payment in any form including cash, check, credit card, and/or the like.

In one embodiment, if the processing platform fails to locate the transmitted payment device information and/or mobile device identification information in the database of customer records, the processing platform may send a message to the POS terminal informing the terminal. The POS terminal may then prompt the customer to join the loyalty program. In one embodiment, the customer could then join the program by inputting information into the POS terminal including mobile device identification information. The customer may enter this information directly into the terminal or may orally relay the information to the merchant to input. The POS terminal may then transmit that information to the processing platform where the processing platform creates a new customer record in the loyalty program's customer records database. The processing platform may then proceed processing the transaction, creating an adjusted amount due by applying any discounts applicable to new loyalty program members. The POS terminal may print a receipt for the new member providing details about the program as well as opt-out information. The processing platform may similarly send a welcome message to the new member's mobile device using the stored mobile device identification information containing details of the program and opt-out information.

Upon completion of the transaction, the POS terminal may print a receipt for the customer having normal information contained in a receipt, as well as a promotional message. The promotional message may inform program members of upcoming program discounts or may encourage non-members to join the program. The message may contain instructions on how to enroll in the loyalty program at a later time. Upon completion of the transaction at the processing platform, the processing platform may use the mobile identification information stored in the located customer record to transmit a promotional message to the customer's mobile device. This message, for example, may consist of an SMS message transmitted to the customer's mobile phone.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying FIGURES. It is to be expressly understood, however, that each of the FIGURES is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
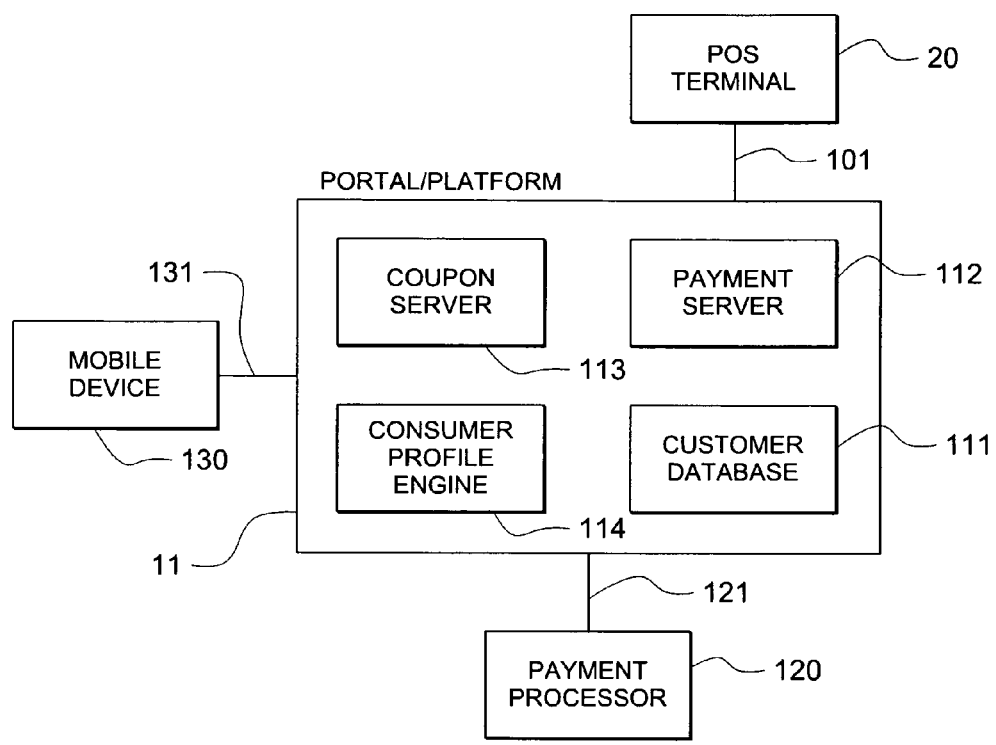
FIG. 1 is an overview of one embodiment of a payment/loyalty program architecture.

FIG. 1 illustrates one embodiment of system 10 for administering a loyalty program and processing customer payments for transactions. The system contains at least one point of sale (POS) terminal, such as terminal 20. The POS terminal is connected to processing platform 11 through a communications link, such as link 101. Communications link 101 may utilize any communications hardware and methods known in the art capable of transmitting data and link 101 may include phone lines, T1 lines, ISDN lines, or wireless links such as wireless links using the IEEE 802.11 standard. In some embodiments, communications link 101 may comprise multiple communications system and protocols. For example, in one embodiment, the POS terminal may connect over an Ethernet cable to a cable modem that then communicates over a fiber-optic cable with a server that then connects over a different fiber optic line to another server that then connects over a T1 line to the processing platform 11.

Processing platform 11 in some embodiments may be physically located in a remote location from POS terminal 20. The processing platform contains, for example, a database of customer records 111. Processing platform 11 may administer one or more loyalty programs and may contain different customer database 111 for each loyalty program. The customer record may contain mobile device identification information, payment device identification information, and loyalty program data for the customer. In some embodiments, the customer's mobile device identification may be a phone number for a mobile phone, and the customer's payment device identification may be a credit card number. One customer record may contain payment device identification information for a plurality of payment devices. In some embodiments, the database will only allow a unique mobile device identification to be associated with a single customer record. The customer database may be stored on a server using database storage techniques known to those skilled in the art.

Processing platform 11 may contain software and hardware to perform additional functionality. The processing platform may, for example, contain payment server 112 to process payments and communicate with the payment processor and coupon server 113 to generate and distribute promotional offers. Coupon server functionality is described in the above-identified application entitled "SYSTEM AND METHOD OF INTEGRATING LOYALTY/REWARD PROGRAMS WITH PAYMENT IDENTIFICATION SYSTEMS." The processing platform may additionally contain a customer profile engine 114. Payment server 112, coupon server 113, and customer profile engine 114 may be implemented in software using any programming technique known to those skilled in the art such as XML, C++, or SQL. The software components may be located on a single physical server in some embodiments or may be located on different servers to increase capacity and efficiency as is known in the art.

Processing platform 11 may connect to third party payment processor 120 through communications link 121. Communications link 121 may be implemented using any communications technique known in the art and may comprise multiple physical links, as discussed above with respect to link 101. Third party payment processor 120 accepts payment device information in any standard format and transmits confirmation in any standard format after processing the payment. In this context, payment device information may include minimal information required to identify the payment device, such as a credit card number and expiration date, or could include "swipe data," which is known to those skilled in the art.

Processing platform 11 may connect to the customer's mobile device, such as to device 130 over communications link 131. Communications link 131 may comprise a wireless communications link using a standard wireless communications technique, such as Bluetooth, IEEE 802.11, cdma2000, GPRS, or any other wireless standard known to those in the art. In one embodiment, the customer's mobile device 130 is a mobile telephone identified by a telephone number and capable of receiver SMS messages. In some embodiments, Processing platform 11 establishes temporary communication links with a plurality of mobile devices 130 simultaneously.

Figure 2:
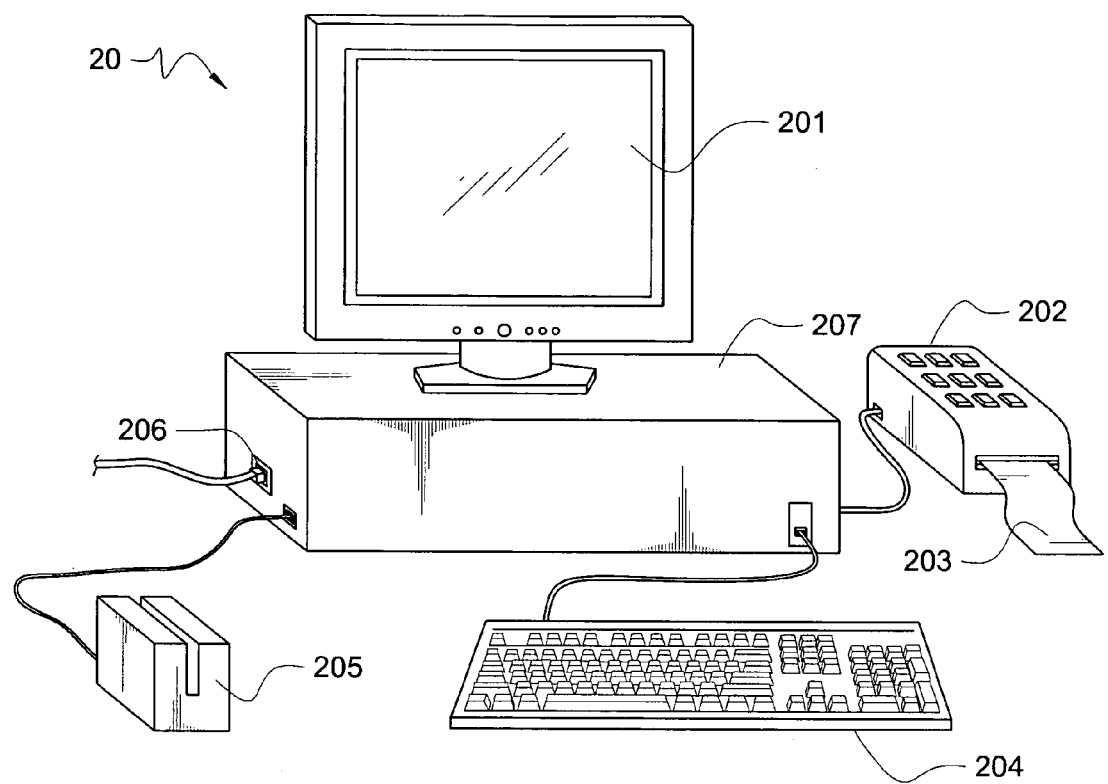
FIG. 2 illustrates a point of sale (POS) terminal for use in one embodiment.

FIG. 2 illustrates a POS terminal, such as terminal 20, which contains display 201 capable of displaying messages to a merchant or customer. POS terminal 20 may also contain printer 202 capable of printing out receipt 203. POS terminal 20 may further contain a data entry device, such as keyboard 204 and a payment device reader, such as reader 205. The data entry device may be a keypad (as shown) or a touch screen integrated with display 201 or any other data entry device known to those skilled in the art. Payment device reader 205 can, for example, read information stored on the magnetic strip of a payment card, such as a credit card or debit card. Payment device reader 205 may also obtain payment information through any other method known in the art, such as, for example, reading an RFID tag or a near-field communication (NFC). In some embodiments, POS terminal 20 does not contain a payment device reader 205, but rather accepts payment device identification information through a data entry device, such as keyboard 204. In some embodiments, POS terminal 20 may also be capable of capturing mobile device identification information in addition and/or as an alternative to payment device information. For example, a data entry device such as keyboard 204 may be used to enter mobile device identification information. As another example, payment device reader 205 may be used to capture mobile device identification information through such methods as RFID, NFC, and/or the like. It should be understood that POS terminal 20 may accept mobile device identification information in addition to or as an alternative to other payment device identification information. Where the mobile device is used by POS terminal 20 to effectuate payment, the mobile device is functioning as a payment device and the mobile device identification information constitutes payment device identification information.

POS terminal 20 also contains hardware for communicating with portal 11 over a communications link 101 (FIG. 1), as discussed above. POS terminal 20 also contains processor 207 capable of running software written in any programming language known to those skilled in the art. Processor 207 may in some embodiments be capable of running software written in a language specifically designed for payment applications, such as SoftPay® by Verifone®. In some embodiments one or more POS terminals may be a Verifone® Omni® 3750 terminal.

Figure 3A:
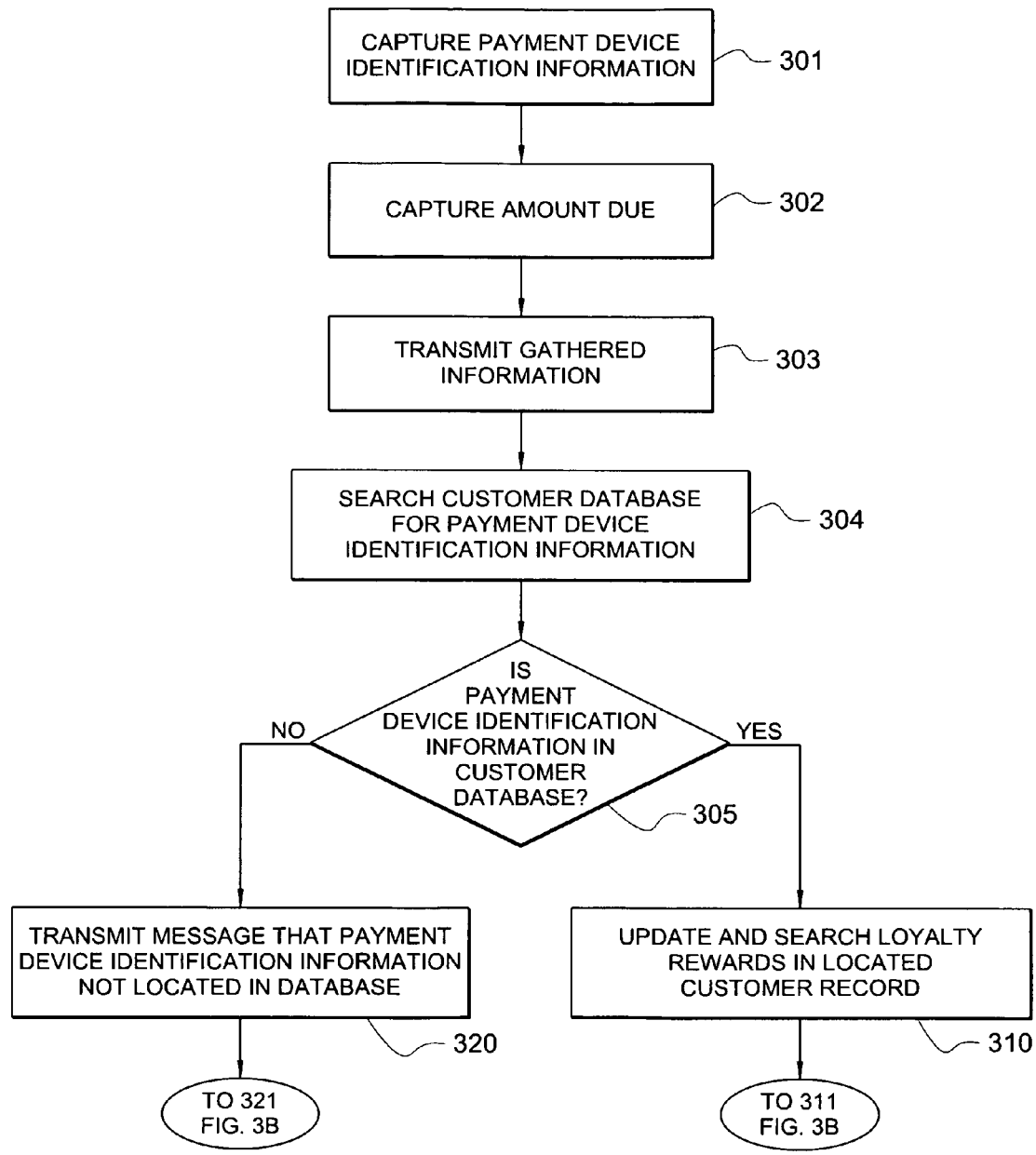
FIGS. 3A, 3B, and 3C are flow charts showing use of the system in one embodiment.
Figure 3B:
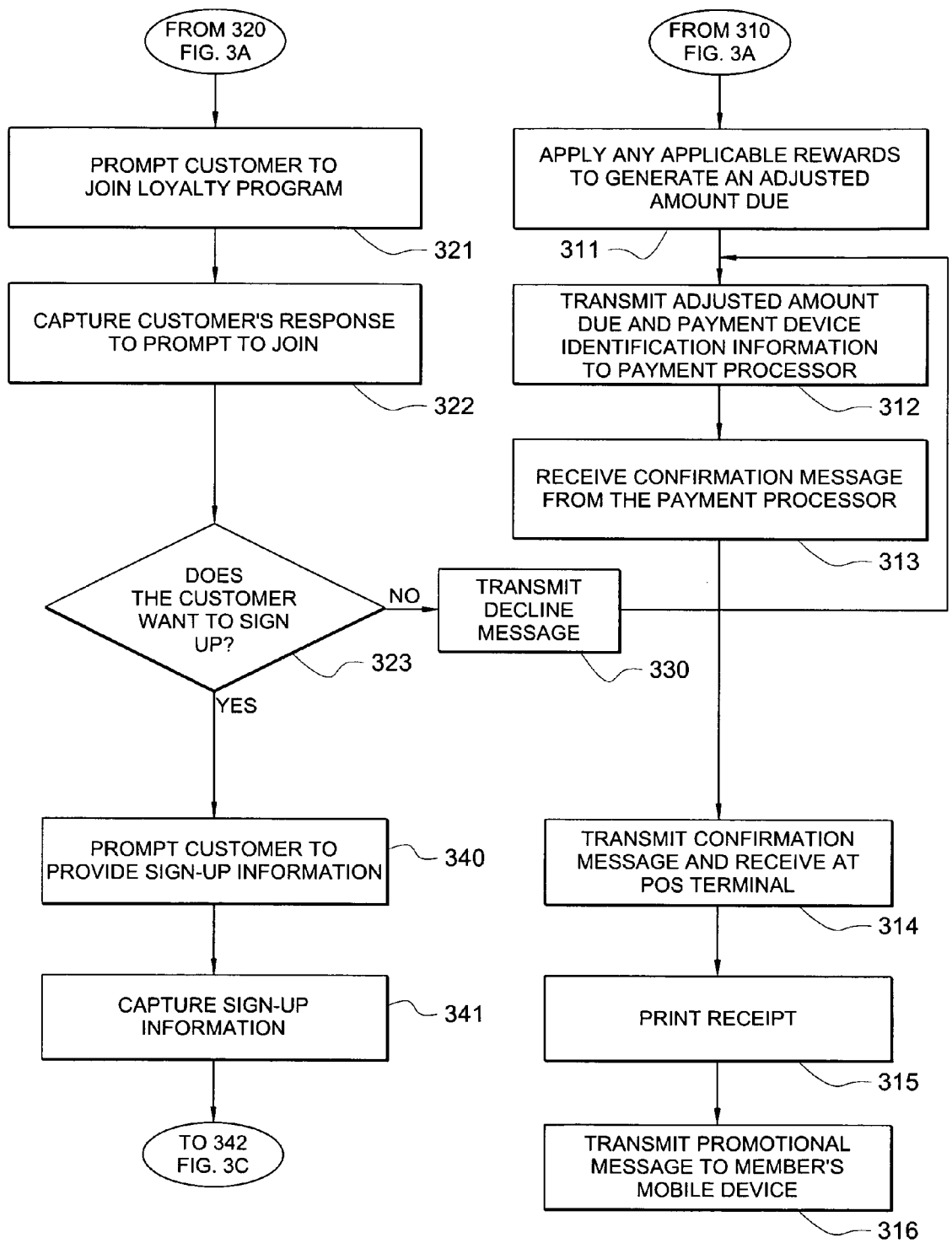
Figure 3C:
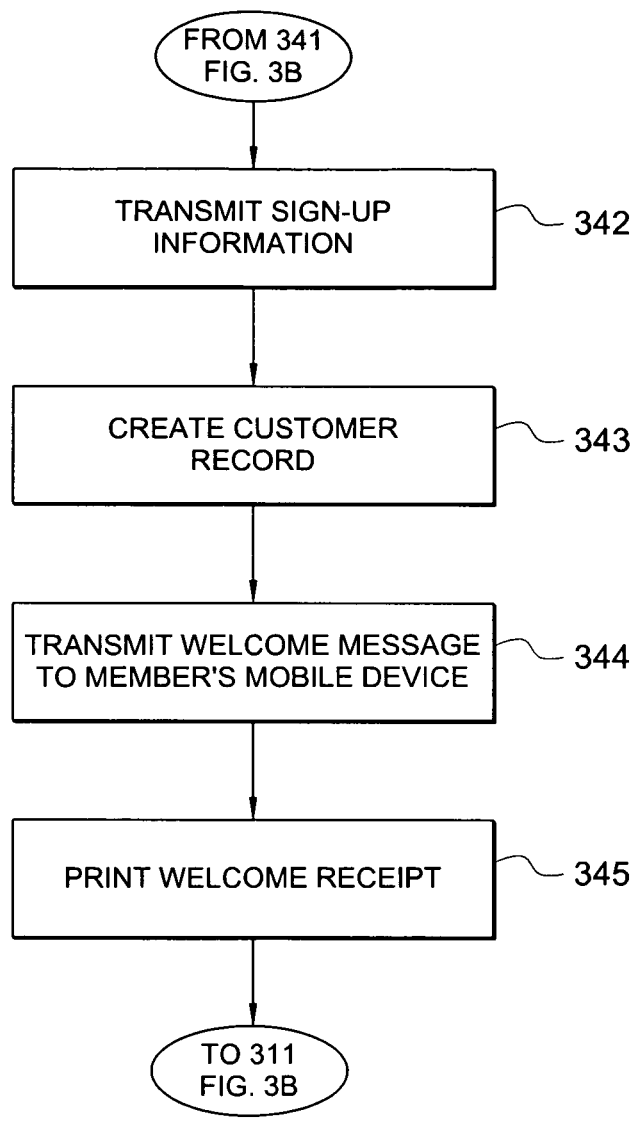

FIGS. 3A, 3B and 3C show flow charts showing use of the system in one embodiment. In some embodiments, the steps may be performed using the exemplary system of FIG. 1 and POS terminal 20 shown in FIG. 2. The steps shown in FIGS. 3A, 3B and 3C are shown in a particular order, but as one skilled in the art would understand, the steps may be performed in other orders and additional (or fewer) steps can be utilized to achieve the desired result.

As shown in FIG. 3A, in process 301, payment device identification information is captured. In one embodiment, the customer may place his or her payment device in proximity of a payment device reader 205 (FIG. 2), which may be part of a POS terminal 20. A merchant may also take the payment device in the form of a payment card from the customer and swipe the card through a payment device reader 205. Payment device reader 205 may capture card information stored on a magnetic strip on a payment card and obtain "swipe information" as is well known in the art. In other embodiments, the customer or merchant may enter payment device identification information using data entry device 204. In some embodiments, the merchant may swipe a payment device and then the customer may enter additional payment device information using a data entry device 204. In another embodiment, payment device reader 205 may obtain payment device information using NFC or RFID technology and/or the like. In these embodiments, the payment device may not be a traditional card, but instead may be any object known to those skilled in the art to contain user identification information, In some situations, the customer may simply place the payment device in proximity to payment device reader 205 to allow the payment device reader to capture the payment device identification information. In another embodiment, the customer's mobile device may function as a payment device. That embodiment is discussed in more detail, below.

In process 302, an amount due for the transaction is captured. Process 302 may occur before, after, or simultaneous with process 301. In one embodiment, the merchant may enter an amount due using data entry device 204. In another embodiment, an amount due may be generated by separate electronic equipment and transmitted electronically to the POS terminal. A cash register may be employed to enter items ordered and generate an amount due. The cash register may then transmit that information electronically to the POS terminal. In another embodiment, the POS terminal may contain such cash register functionality and may generate an amount due after the merchant or customer has entered the items ordered.

In process 303, the information gathered in processes 301 and 302 is transmitted to the location of the customer database. In one embodiment shown in FIG. 1, the database 111 is located within processing platform 11. The information transmitted may include an amount due and payment device (for example, credit card) information. Additional information such as information on the specific items purchased by the customer, date and time information, the name of the merchant, etc. can be transmitted, if desired. Merchant information is important if the customer database is co-located on the same processing platform as customer databases for loyalty programs for other merchants. In some embodiments, the merchant or customer may push a button or enter information into data entry device 204 to cause the system to transmit the gathered information.

In process 304, the customer database is searched to locate the transmitted payment device identification information. Processing platform 11 receives the transmitted information and identifies the specific customer database to be searched. This is done by identifying the merchant through the transmitted information. The information may then be fed to an engine, such as customer profile engine 114, to conduct a search of the selected customer database in accordance with process 304.

Process 304 determines if the customer's payment device information is located in a customer record. If so, the system may continue processing with process 310. If the payment device information is not located, the system may continue with process 320, in which a message will be transmitted to the POS terminal indicating that the payment identification information was not located and allowing the POS terminal to prompt the customer to join the merchant's loyalty program. In some embodiments, the merchant may not wish to prompt its customers to sign up for the loyalty program if they are not already a member, and therefore may not wish to slow down the payment process by performing process 320 et seq. In this case, the system may continue processing with process 312 when the customer's payment identification information is not located.

In process 310, the located customer record is updated to record the current transaction and searched for applicable loyalty rewards. Coupon server 113 (FIG. 1) may receive information about the current transaction as well as information about previous transactions contained in the customer record and determine if the customer is eligible for any loyalty rewards. If the customer is eligible for a reward, the system will enter that reward in the customer record. Such reward could be based on previous customer activity, current purchase items, customer profile information, or any other criteria. A reward may also be entered into the customer's account as a result of the customer signing up for the loyalty program. The customer record may also contain a listing of rewards previously acquired by the customer and the system may search the customer record for such rewards that may be redeemed with the current purchase.

As shown in FIG. 3B, in process 311, if any loyalty rewards are to be applied to the current transaction, an adjusted amount due is generated. If the current transaction does not involve a member of the loyalty program, the adjusted amount due may simply be the full amount. Similarly, if the current transaction involves a member of the loyalty program, but the member is not eligible for loyalty rewards on the transaction, the adjusted amount due may simply be the full amount due.

In process 312, the adjusted amount due and payment device information is transmitted to payment processor 120 (FIG. 1) over communications link 121. The payment device information may be swipe information or any other information accepted by payment processors as identifying the specific payment device. As is known in the art, payment processors charge less to process a transaction where swipe information is provided. In some embodiments, the information is transmitted in a standard format specified by the payment processor and known to those skilled in art.

In process 313, a confirmation message is received from payment processor 120. This confirmation message may be received over communications link 121. The confirmation message may contain routing information specifically identifying the transaction confirmed and the total amount charged.

In process 314, a confirmation message is sent and received at POS terminal 20. The confirmation message may contain routing information specifically identifying the transaction confirmed and the total amount. The confirmation message may further contain information about any loyalty rewards applied. Alternatively, since POS terminal 20 knows the original amount due as transmitted, if the confirmation message contains the actual amount charged (the adjusted amount due), the POS terminal may calculate the discount applied.

In process 315, receipt 203 is printed for the customer. In some embodiments, the receipt 203 is printed at POS terminal 20 using printer 202. In addition to normal information that would be contained on a sale receipt as those skilled in the art would understand, the receipt may contain a promotional message about the loyalty program. For example, the receipt may contain text telling the customer how many purchases he or she is away from earning another loyalty reward. In another example, the receipt may contain text informing the consumer of future promotions. The receipt may also in some embodiments identify the amount of any discount applied. If the receipt is for a transaction involving a customer who is not a member of the loyalty program, the receipt may contain a message encouraging the customer to join the loyalty program. For example, the receipt may contain text explaining discounts that would have been applied if the customer was a member of the program. This promotional message could also contain instructions on how to join the loyalty program, including providing a phone number or web address for the customer to call to join the program. A system and process for enrolling customers in a loyalty program through a website or phone call are described in the above-identified application entitled "SYSTEM AND METHOD OF INTEGRATING LOYALTY/REWARD PROGRAMS WITH PAYMENT IDENTIFICATION INFORMATION."

In process 316, a promotional message is transmitted to the member's mobile device. If the search of payment device identification information in process 304 successfully located a customer record, processing platform 11 may transmit a promotional message to the customer's mobile device 130 using the mobile device identification information stored in the customer's customer record over communications link 131. The time of performance of process 316 is not linked to the time of performance of any other steps, except that it must be performed after process 304 because it relies on information located in process 304. Processing platform 11 may send an SMS message to the customer's mobile phone number using techniques and hardware known to those skilled in the art. The promotional message may or may not contain the information traditionally found on a receipt such as the amount due and the cost of items, and may contain information about the promotion received and the customer's current status in the loyalty program. The promotional message may also inform the customer about additional loyalty program options.

In process 320 (FIG. 3A), a message is transmitted indicating that the payment device information was not located in the customer database. This message is sent from processing platform 11 over communications link 101 to POS terminal 20. The message may be in any format understood by the POS terminal and may simply reference the specific transaction and contain an indicator that the payment device identification information was not located in the customer database.

As shown in FIG. 3B, in process 321, a message is displayed asking the customer if he or she would like to join the loyalty program. In one embodiment, this message may be displayed on display 201 of POS terminal 20 (FIG. 2). The display may be visible to the merchant and not the customer and the merchant may orally ask the customer if he or she would like to join the loyalty program after the merchant sees the offer to join displayed on display 201. In another embodiment, the customer may view the offer directly.

In process 322, the customer's response to the prompt to join is captured. In one embodiment, the customer indicates his or her choice by selecting a choice using a data entry device at POS terminal 20 (FIG. 2) by depressing a key on a keypad or touching a portion of a touch screen display displaying his options. In another embodiment, the customer may orally announce his choice and the merchant may enter the choice using data entry device 204 at POS terminal 20.

Process 323 determines if the customer chooses to join the program. If the customer chooses to join the program, processing may continue with process 340, and if the customer chooses not to join the program, processing may continue with process 330. As discussed above, in some embodiments the merchant may elect not to prompt customers to join, in which case processes 320 and 321 may not occur. In another embodiment, a message may still be transmitted in process 320, but the POS terminal may automatically continue processing with process 330, bypassing processes 321, 322, and 323.

In process 330, a decline message is transmitted indicating that enrollment information will not be transmitted and processing of the transaction may continue. In some embodiments, this message is sent from POS terminal 20 over communications link 101 to processing platform 11 (FIG. 1). The message may be in any format understood by processing platform 11. The message may simply reference the specific transaction and contain an indicator that enrollment information will not follow and processing of the transaction should continue. Processing may then continue with process 312.

In process 340, the customer is prompted to provide sign-up information. The sign-up information requested may be any information required for a complete customer record. Such information may include basic identification information such as a name and address as well as contact information such as an e-mail address or mobile device identification information, such as a phone number for a mobile phone. Information previously obtained in process 301 from the payment device may be displayed for the customer to confirm the accuracy of that information. The customer may also be asked if he or she would like to associate other payment devices with the account in which case the system may capture information from those payment devices as described in process 301. The customer may be prompted by messages displayed on display 201 of POS terminal 20 (FIG. 2). The display may be visible to the merchant and not the customer and the merchant may orally ask the customer for the information requested or the customer may view the prompts directly.

In process 341, the customer's sign up information is captured. In one embodiment, the customer enters sign-up information using a data entry device 204 at POS terminal 20 (FIG. 2) by depressing keys on a keypad or touching a portion of a touch screen display displaying options. In another embodiment, the customer may verbally relay information to the merchant and the merchant may enter the information using data entry device 204 at POS terminal 20. The entered information may be displayed for the user allowing the user to confirm the information is correct before processing continues. It may be desirable for customers to be able to sign up for the merchant's loyalty program without first initiating a transaction and thus the merchant or customer may be able to initiate the sign up process by selecting an option from a main menu. In such a case, the sign-up process may begin with process 341.

As shown in FIG. 3C, in process 342, sign-up information is transmitted. The information is transmitted in a message sent from POS terminal 20 over communications link 101 to processing platform 11. The message may be in any format understood by processing platform 11. The message may reference the specific transaction and contain the sign-up information provided by the customer. The message may or may not contain information captured from the customer's payment card and previously transmitted in process 303.

In process 343, a customer record is created in the merchant's loyalty program's customer records database 111. The customer record is created at a processing platform 11. Coupon server 113 or another processing entity within processing platform 111 may be queried to identify any loyalty rewards applicable to enrolling members of the merchant's loyalty program. Any located loyalty rewards may then be placed in the customer record to be applied to the current transaction. In addition to use in the processes described herein, the customer record may be used in other facets of a loyalty program. Such other facets may include the transmitting of messages containing digital coupons to a customer's mobile device based on a customer's profile and not associated with any particular transaction. Such a system and method are described in the above referenced application entitled "A SYSTEM AND METHOD OF ALERTING USERS TO OFFERS USING ELECTRONIC DEVICES." After creating a customer record in process 344, processing of the transaction may immediately continue with process 311, while processes 344 and 345 may occur simultaneously, prior to, or subsequent to the transaction processing beginning with process 311.

In process 344, a welcome message is transmitted to the customer's mobile device. The message may be sent using the mobile device identification information provided by the customer in process 341 and stored in the customer record in process 343. The welcome message may be sent as an SMS message to the customer's mobile phone using the customer's mobile phone number stored in the customer's customer record as mobile device identification information. The welcome message may include information about the loyalty program, as well as promotional messages. Possible promotional messages are described above in the discussion of process 316. In some embodiments, the welcome message may also contain instructions for opting out of receiving future messages on the mobile device. In some embodiments, the welcome message may also contain a request that the customer acknowledge the message in some fashion. Such an acknowledgment may be used to confirm that the customer provided valid and accurate mobile device identification information. In some embodiments, a customer may not be deemed a valid member of the loyalty program until the customer acknowledges the welcome message. The customer may acknowledge the welcome message in some embodiments simply by replying to the welcome message using the same communications protocol used to send the message. Other methods of acknowledging may include calling an activation number or visiting a specific website and signing in.

In process 345, a welcome receipt is printed for the customer. In some embodiments, the receipt may be printed on printer 202 at POS terminal 20 (FIG. 2). The receipt may be printed immediately after the customer enters his contact information or the receipt may not be printed until POS terminal 20 receives a confirmation message from processing platform 11 that the customer information was successfully entered into the customer database in process 343. The welcome receipt may contain program rules including privacy information, instructions for opting out of receiving future messages at the mobile device, instructions for quitting the program, as well as promotional messages.

Figure 4A:
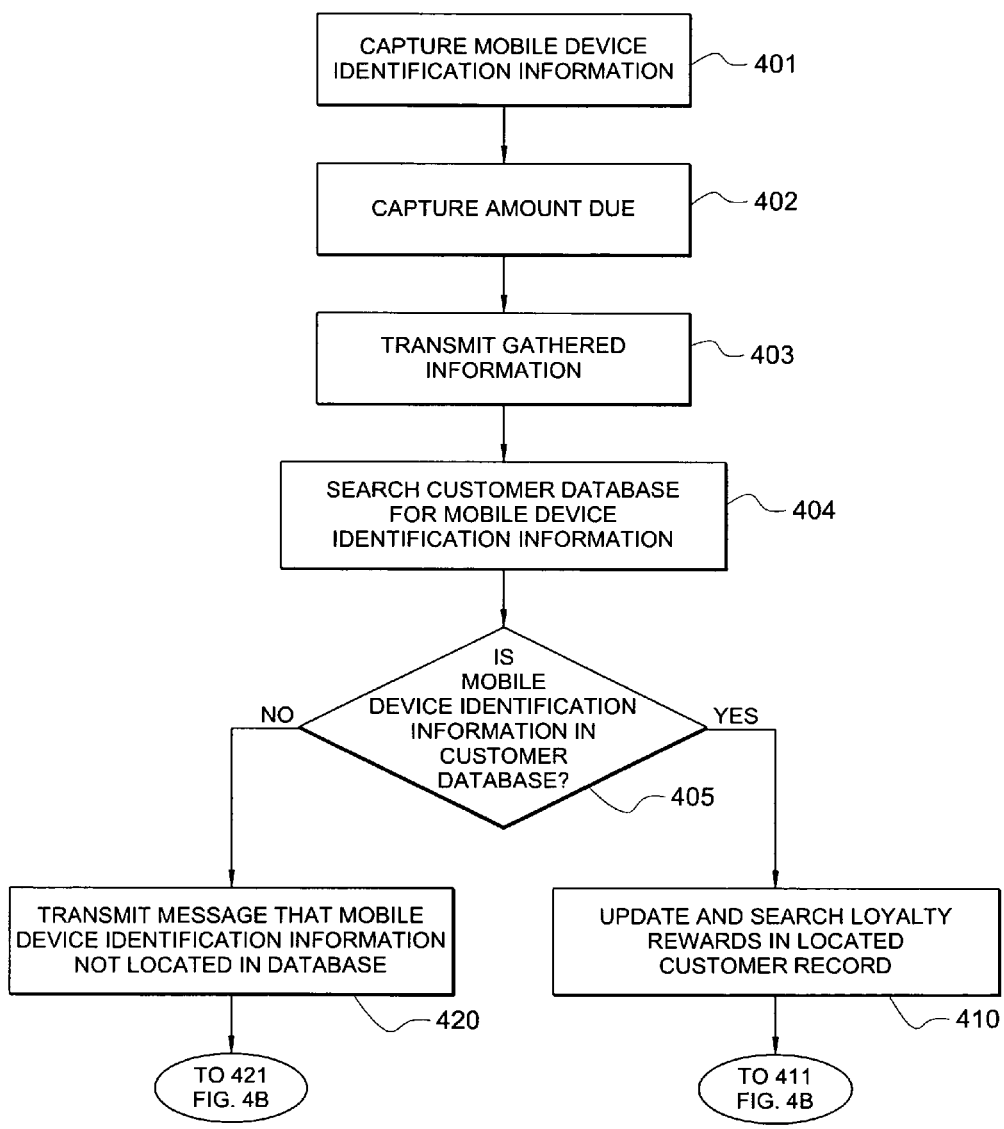
FIGS. 4A, 4B, and 4C are flow charts showing use of the system in another embodiment.
Figure 4B:
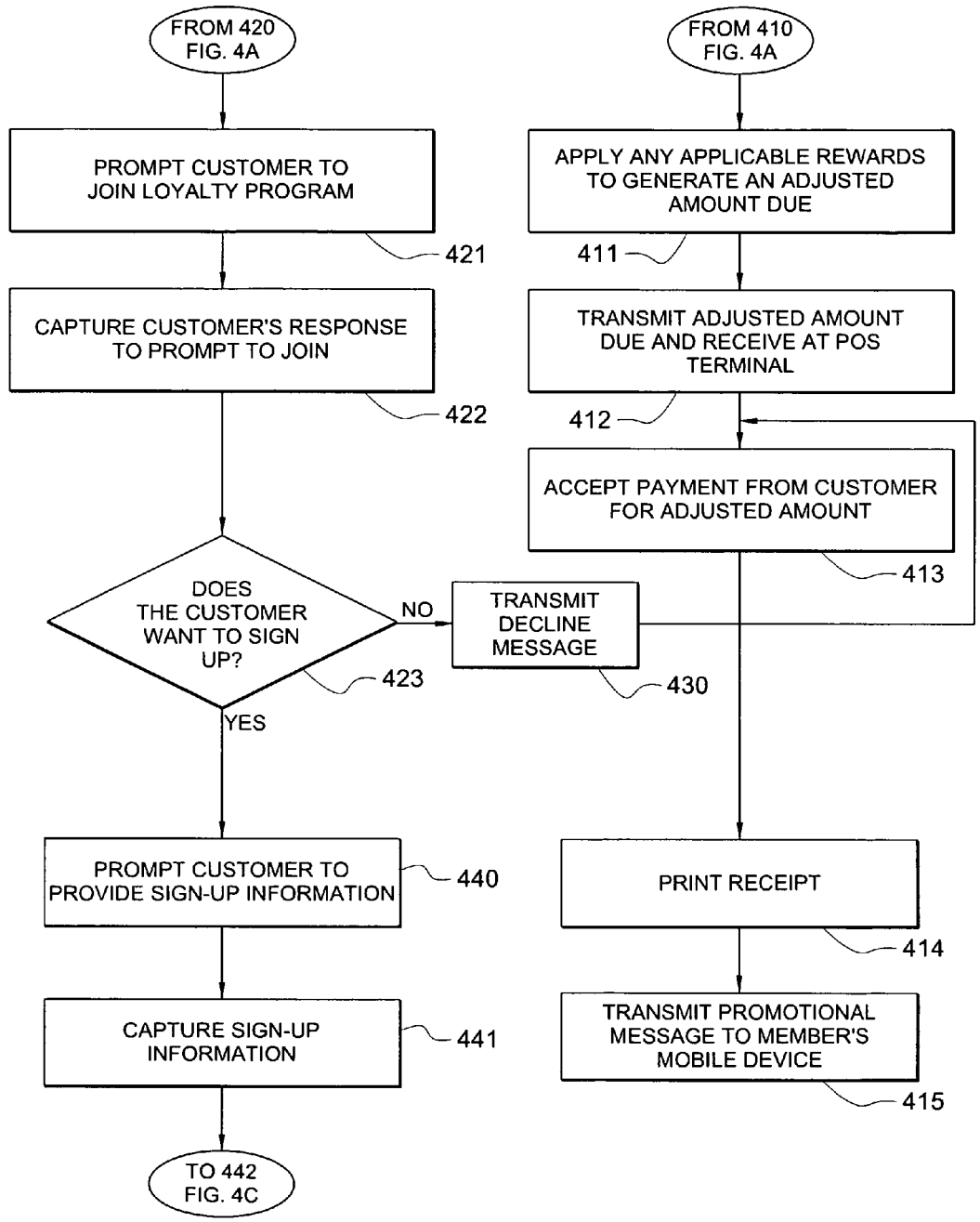
Figure 4C:
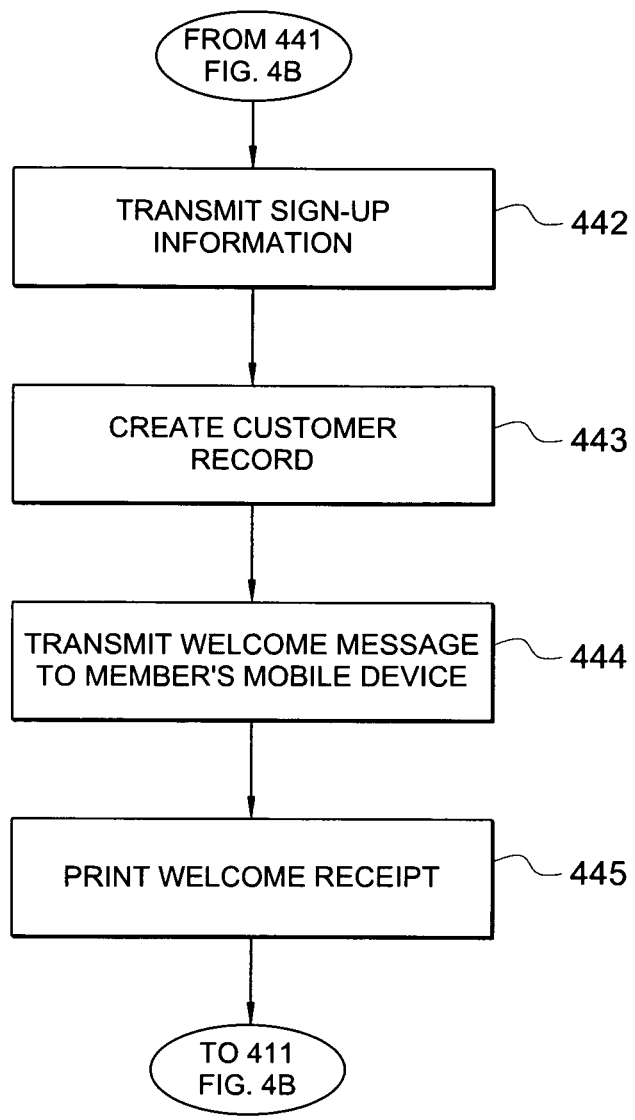

FIGS. 4A, 4B and 4C show flow charts showing use of the system in another embodiment. In some embodiments, the steps may be performed using the exemplary system of FIG. 1 and POS terminal 20 shown in FIG. 2. The steps shown in FIGS. 4A, 4B and 4C are shown in a particular order, but as one skilled in the art would understand, the steps may be performed in other orders and additional (or fewer) steps can be utilized to achieve the desired result. Many of the processes shown in FIGS. 4A, 4B, and 4C may operate in the same or similar to the processes of FIGS. 3A, 3B, and 3C. While the processes of FIGS. 3A, 3B, and 3C rely on the customer using a payment device uniquely associated with the customer, the processes of FIGS. 4A, 4B, and 4C identify the customer based on the customer's mobile device identification information and thus allow the customer to pay in any manner, including manners not uniquely identifying the users, such as paying cash.

As shown in FIG. 4A, in process 401, mobile device identification information is captured. In one embodiment, the customer may place his or her mobile device in proximity of a payment device reader 205 (FIG. 2), which may be part of a POS terminal 20. In one embodiment, payment device reader 205 may obtain mobile device information using NFC or RFID technology and/or the like. In some situations, the customer may simply place the payment device in proximity to payment device reader 205 to allow the payment device reader to capture the payment device identification information. In another embodiment, the customer may key mobile device identification information into POS terminal 20. The customer may enter the mobile device identification information into a device such as keypad 204 (FIG. 2) or display 201 (FIG. 2) may function as a touch-screen display allowing the customer to key in mobile device identification information. Similarly, the customer may verbally communication mobile device identification information to the merchant who may then enter the information into POS terminal 20, in some embodiments using a device such as keypad 204 or display 201. In some embodiments, the mobile device identification information may be the phone number assigned to a customer's cellular phone. In other embodiments, the mobile device identification may be another value that identifies the users and/or specific mobile device such as an MSID, ESN, and/or the like.

In some embodiments, both mobile device identification information and payment device identification information may be captured in process 401. The payment device identification information may be transmitting in process 403 or may simply be saved at POS terminal 20 (FIG. 2) for processing of payment in process 413. The mobile device identification information may be captured through the process described in process 302 (FIG. 3A). Additionally, the mobile device may store payment device identification information such that both mobile device identification information and payment device identification information are received by POS terminal 20 through such methods as RFID, NFC, and/or the like.

In process 402, an amount due for the transaction is captured. Process 402 may occur before, after, or simultaneous with process 401. In one embodiment, the merchant may enter an amount due using data entry device 204. In another embodiment, an amount due may be generated by separate electronic equipment and transmitted electronically to the POS terminal. A cash register may be employed to enter items ordered and generate an amount due. The cash register may then transmit that information electronically to the POS terminal. In another embodiment, the POS terminal may contain such cash register functionality and may generate an amount due after the merchant or customer has entered the items ordered.

In process 403, the information gathered in processes 401 and 402 is transmitted to the location of the customer database. In one embodiment shown in FIG. 1, the database 111 is located within processing platform 11. The information transmitted may include an amount due and mobile device identification information. Additional information such as payment device identification information, information on the specific items purchased by the customer, date and time information, the name of the merchant, etc. can be transmitted, if desired. Merchant information is important if the customer database is co-located on the same processing platform as customer databases for loyalty programs for other merchants. In some embodiments, the merchant or customer may push a button or enter information into data entry device 204 to cause the system to transmit the gathered information.

In process 404, the customer database is searched to locate the transmitted mobile device identification information. Processing platform 11 receives the transmitted information and identifies the specific customer database to be searched. This is done by identifying the merchant through the transmitted information. The information may then be fed to an engine, such as customer profile engine 114, to conduct a search of the selected customer database in accordance with process 404.

Process 404 determines if the customer's mobile device information is located in a customer record. If so, the system may continue processing with process 410. If the payment device information is not located, the system may continue with process 420, in which a message will be transmitted to the POS terminal indicating that the payment identification information was not located and allowing the POS terminal to prompt the customer to join the merchant's loyalty program.

In some embodiments, the merchant may not wish to prompt its customers to sign up for the loyalty program if they are not already a member, and therefore may not wish to slow down the payment process by performing process 420 et seq. In this case, the system may continue processing with process 413 when the customer's mobile identification information is not located.

In process 410, the located customer record is updated to record the current transaction and searched for applicable loyalty rewards. Coupon server 113 (FIG. 1) may receive information about the current transaction as well as information about previous transactions contained in the customer record and determine if the customer is eligible for any loyalty rewards. If the customer is eligible for a reward, the system will enter that reward in the customer record. Such reward could be based on previous customer activity, current purchase items, customer profile information, or any other criteria. A reward may also be entered into the customer's account as a result of the customer signing up for the loyalty program. The customer record may also contain a listing of rewards previously acquired by the customer and the system may search the customer record for such rewards that may be redeemed with the current purchase.

As shown in FIG. 4B, in process 411, if any loyalty rewards are to be applied to the current transaction, an adjusted amount due is generated. If the current transaction does not involve a member of the loyalty program, the adjusted amount due may simply be the full amount. Similarly, if the current transaction involves a member of the loyalty program, but the member is not eligible for loyalty rewards on the transaction, the adjusted amount due may simply be the full amount due.

In process 412, the adjusted amount due is sent from processing platform 11 and received at POS terminal 20. In some embodiments, the adjusted amount due may be sent in a message over communications link 101.

In process 413, payment is accepted at POS terminal 20 from the customer for the adjusted amount due. Payment may be in any form such as cash, check, gift certificate, credit card, debit card, and/or the like. As described above, payment information may have been received in the form of payment device identification information during process 401. Where payment device identification information is received, either in process 413 or process 401, the payment device identification information may be transmitted to a third party payment processor such as payment processor 120 (FIG. 1) or may be transmitted to processing platform 11 (FIG. 1). If the payment device identification information is transmitted to processing platform 1, processes 312-314 (FIG. 3B) may then be performed.

In process 414, receipt 203 is printed for the customer. In some embodiments, the receipt 203 is printed at POS terminal 20 using printer 202. In addition to normal information that would be contained on a sale receipt as those skilled in the art would understand, the receipt may contain a promotional message about the loyalty program. For example, the receipt may contain text telling the customer how many purchases he or she is away from earning another loyalty reward. In another example, the receipt may contain text informing the consumer of future promotions. The receipt may also in some embodiments identify the amount of any discount applied. If the receipt is for a transaction involving a customer who is not a member of the loyalty program, the receipt may contain a message encouraging the customer to join the loyalty program. For example, the receipt may contain text explaining discounts that would have been applied if the customer was a member of the program. This promotional message could also contain instructions on how to join the loyalty program, including providing a phone number or web address for the customer to call to join the program. A system and process for enrolling customers in a loyalty program through a website or phone call are described in the above-identified application entitled "SYSTEM AND METHOD OF INTEGRATING LOYALTY/REWARD PROGRAMS WITH PAYMENT IDENTIFICATION INFORMATION."

In process 415, a promotional message is transmitted to the member's mobile device. If the search of mobile device identification information in process 404 successfully located a customer record, processing platform 11 may transmit a promotional message to the customer's mobile device 130 using the mobile device identification information stored in the customer's customer record over communications link 131. It should be understood that a customer record may contain more than one type of mobile device identification information. For example, a customer record may contain a serial number transmitted by the mobile device to identify the phone as well as another mobile device identification information that may be used to address a communication to the mobile device such as a phone number. The time of performance of process 415 is not linked to the time of performance of any other steps, except that it must be performed after process 404 because it relies on information located in process 404. In some embodiments, processing platform 11 may send an SMS message to the customer's mobile phone number using techniques and hardware known to those skilled in the art. The promotional message may or may not contain the information traditionally found on a receipt such as the amount due and the cost of items, and may contain information about the promotion received and the customer's current status in the loyalty program. The promotional message may also inform the customer about additional loyalty program options.

In process 420 (FIG. 4A), a message is transmitted indicating that the mobile device information was not located in the customer database. This message may be sent from processing platform 11 over communications link 101 to POS terminal 20. The message may be in any format understood by the POS terminal and may simply reference the specific transaction and contain an indicator that the mobile device identification information was not located in the customer database.

As shown in FIG. 4B, in process 421, a message is displayed asking the customer if he or she would like to join the loyalty program. In one embodiment, this message may be displayed on display 201 of POS terminal 20 (FIG. 2). The display may be visible to the merchant and not the customer and the merchant may orally ask the customer if he or she would like to join the loyalty program after the merchant sees the offer to join displayed on display 201. In another embodiment, the customer may view the offer directly.

In process 422, the customer's response to the prompt to join is captured. In one embodiment, the customer indicates his or her choice by selecting a choice using a data entry device at POS terminal 20 (FIG. 2) by depressing a key on a keypad or touching a portion of a touch screen display displaying his options. In another embodiment, the customer may orally announce his choice and the merchant may enter the choice using data entry device 204 at POS terminal 20.

Process 423 determines if the customer chooses to join the program. If the customer chooses to join the program, processing may continue with process 440, and if the customer chooses not to join the program, processing may continue with process 430. As discussed above, in some embodiments the merchant may elect not to prompt customers to join, in which case processes 420 and 421 may not occur. In another embodiment, a message may still be transmitted in process 420, but the POS terminal may automatically continue processing with process 430, bypassing processes 421, 422, and 423.

In process 430, a decline message is transmitted indicating that enrollment information will not be transmitted and processing of the transaction may continue. In some embodiments, this message is sent from POS terminal 20 over communications link 101 to processing platform 11 (FIG. 1). The message may be in any format understood by processing platform 11. The message may simply reference the specific transaction and contain an indicator that enrollment information will not follow and processing of the transaction should continue. Processing may then continue with process 413.

In process 440, the customer is prompted to provide sign-up information. The sign-up information requested may be any information required for a complete customer record. Such information may include basic identification information such as a name and address as well as contact information such as an e-mail address or mobile device identification information, such as a phone number for a mobile phone. Information previously obtained in process 401 may be displayed for the customer to confirm the accuracy of that information. The customer may also be asked if he or she would like to associate any payment devices with the account in which case the system may capture information from those payment devices as described in process 301. The customer may be prompted by messages displayed on display 201 of POS terminal 20 (FIG. 2). The display may be visible to the merchant and not the customer and the merchant may orally ask the customer for the information requested or the customer may view the prompts directly.

In process 441, the customer's sign up information is captured. In one embodiment, the customer enters sign-up information using a data entry device 204 at POS terminal 20 (FIG. 2) by depressing keys on a keypad or touching a portion of a touch screen display displaying options. In another embodiment, the customer may verbally relay information to the merchant and the merchant may enter the information using data entry device 204 at POS terminal 20. The entered information may be displayed for the user allowing the user to confirm the information is correct before processing continues. It may be desirable for customers to be able to sign up for the merchant's loyalty program without first initiating a transaction and thus the merchant or customer may be able to initiate the sign up process by selecting an option from a main menu. In such a case, the sign-up process may begin with process 441.

As shown in FIG. 4C, in process 442, sign-up information is transmitted. The information is transmitted in a message sent from POS terminal 20 over communications link 101 to processing platform 11. The message may be in any format understood by processing platform 11. The message may reference the specific transaction and contain the sign-up information provided by the customer. The message may or may not contain information captured from the customer's payment card and previously transmitted in process 303.

In process 443, a customer record is created in the merchant's loyalty program's customer records database 111. The customer record is created at a processing platform 11. Coupon server 113 or another processing entity within processing platform 11 may be queried to identify any loyalty rewards applicable to enrolling members of the merchant's loyalty program. Any located loyalty rewards may then be placed in the customer record to be applied to the current transaction. In addition to use in the processes described herein, the customer record may be used in other facets of a loyalty program. Such other facets may include the transmitting of messages containing digital coupons to a customer's mobile device based on a customer's profile and not associated with any particular transaction. Such a system and method are described in the above referenced application entitled "A SYSTEM AND METHOD OF ALERTING USERS TO OFFERS USING ELECTRONIC DEVICES." After creating a customer record in process 444, processing of the transaction may immediately continue with process 411, while processes 444 and 445 may occur simultaneously, prior to, or subsequent to the transaction processing beginning with process 411.

In process 444, a welcome message is transmitted to the customer's mobile device. The message may be sent using the mobile device identification information provided by the customer in process 441 and stored in the customer record in process 443. The welcome message may be sent as an SMS message to the customer's mobile phone using the customer's mobile phone number stored in the customer's customer record as mobile device identification information. The welcome message may include information about the loyalty program, as well as promotional messages. Possible promotional messages are described above in the discussion of process 415. In some embodiments, the welcome message may also contain instructions for opting out of receiving future messages on the mobile device. In some embodiments, the welcome message may also contain a request that the customer acknowledge the message in some fashion. Such an acknowledgment may be used to confirm that the customer provided valid and accurate mobile device identification information. In some embodiments, a customer may not be deemed a valid member of the loyalty program until the customer acknowledges the welcome message. The customer may acknowledge the welcome message in some embodiments simply by replying to the welcome message using the same communications protocol used to send the message. Other methods of acknowledging may include calling an activation number or visiting a specific website and signing in.

In process 445, a welcome receipt is printed for the customer. In some embodiments, the receipt may be printed on printer 202 at POS terminal 20 (FIG. 2). The receipt may be printed immediately after the customer enters his contact information or the receipt may not be printed until POS terminal 20 receives a confirmation message from processing platform 11 that the customer information was successfully entered into the customer database in process 443. The welcome receipt may contain program rules including privacy information, instructions for opting out of receiving future messages at the mobile device, instructions for quitting the program, as well as promotional messages.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of identifying a single loyalty program account of a user when the user uses one of a plurality of credit card numbers to pay for transactions at a retailer that provides discounts to the user through the single loyalty program account, the method being implemented by a processing platform having one or more physical processors programmed by one or more instructions to perform the method, the method comprising:

causing, by the processing platform, an association of a single loyalty program account that is related to the user and a plurality of credit card numbers that are related to the user to be stored such that the single loyalty program account is identifiable based on a use of any one of the plurality of credit card numbers, wherein the plurality of credit card numbers comprise a first credit card number that identifies a first credit card account of the user and a second credit card number that identifies a second credit card account of the user;

receiving, by the processing platform, the first credit card number in association with a first transaction;

identifying, by the processing platform, the single loyalty program account based on the first credit card number;

identifying, by the processing platform, a first discount to be applied to the first transaction based on the single loyalty program account;

causing, by the processing platform, the first discount to be applied to the first transaction;

receiving, by the processing platform, the second credit card number in association with a second transaction different from the first transaction;

identifying, by the one or more physical processors, the single loyalty program account based on the second credit card number;

identifying, by the processing platform, a second discount to be applied to the second transaction based on the single loyalty program account; and causing, by the processing platform, the second discount to be applied to the second transaction.

2. The method of claim 1, further comprising:
receiving, by the processing platform, a total amount due for the first transaction;
determining, by the processing platform, an adjusted amount due based on the total amount due for the first transaction and the first discount; and
transmitting, by the processing platform, the adjusted amount due and the first credit card number to the payment processing service for payment using the first credit card account.

3. The method of claim 1, further comprising:
identifying, by the processing platform, a mobile device associated with the first credit card number; and
transmitting, by the processing platform, one or more promotions associated with the single loyalty program to the mobile device.

4. The method of claim 3, wherein transmitting a message comprises:
sending, by the processing platform, a Short Message Service (SMS) message to the mobile device.

5. The method of claim 1, wherein causing the first discount to be applied to the first transaction comprises:
communicating, by the processing platform, the first discount to a point of sale terminal for payment processing by the point of sale terminal.

6. The method of claim 1, the method further comprising:
obtaining, by the processing platform, a customer profile associated with the first credit card number; and
identifying, by the one or more processors, a promotion based on the customer profile; and
providing the promotion to the user.

7. The method of claim 1, the method further comprising:
receiving, by the processing platform, an association of the first credit card number with a plurality of different loyalty programs; and
causing, by the platform, the association between the first credit card number and the plurality of different loyalty programs to be stored.

8. A method of identifying a single loyalty program account of a user when the user uses one of a plurality of credit card numbers to pay for transactions at a retailer that provides discounts to the user through the single loyalty program account, the method being implemented at a point of sale computer system of a merchant, the point of sale computer system having one or more processors programmed by one or more instructions to perform the method, the method comprising:

obtaining, by the point of sale computer system, a first credit card number that identifies a first credit account used to pay for a first transaction at the retailer, wherein the first credit card number is issued by a first issuing financial institution, and wherein the first transaction is associated with a first total amount;

transmitting, by the point of sale computer system, the first credit card number to a remote processing platform;

receiving, by the point of sale computer system, from the remote processing platform, a first amount of savings associated with the single loyalty program account of the user, wherein the single loyalty program account is identified at the remote processing platform based on the first credit card number;

determining, by the point of sale computer system, a first amount to be paid based on the first total amount and the first amount of savings;

transmitting, by the point of sale computer system, a payment request to a third party payment processor based on the first credit card number and the first amount to be paid;

receiving, by the point of sale computer system, a payment confirmation from the third party payment processor;

providing, by the point of sale computer system, a first receipt that indicates the first amount to be paid;

obtaining, by the point of sale computer system, a second credit card number that identifies a second credit account used to pay for a second transaction at the merchant, wherein the second credit card number is issued by a second issuing financial institution, and wherein the second transaction is associated with a second total amount;

transmitting, by the point of sale computer system, the second credit card number to the remote processing platform;

receiving, by the point of sale computer system, from the remote processing platform, a second amount of savings associated with the single loyalty program account of the user, wherein the single loyalty program account is identified at the remote processing platform based on the second credit card number;

determining, by the point of sale computer system, a second amount to be paid based on the second total amount and the second amount of savings;

transmitting, by the point of sale computer system, a payment request to the third party payment processor based on the second credit card number and the second amount to be paid;

receiving, by the point of sale computer system, a second payment confirmation from the third party payment processor; and providing, by the point of sale computer system, a second receipt that indicates the second amount to be paid.

9. A method of enrolling a customer in a loyalty program during a transaction being paid for using a credit card number and associating a plurality of credit card numbers with a loyalty program account, the method being implemented by a processing platform having one or more physical processors programmed by one or more computer program instructions to perform the method, the method comprising:

receiving, by the processing platform, from a merchant, first identification information that identifies a first payment device used to pay for the transaction;

determining, by the processing platform, whether the first identification information is associated with any loyalty program, accounts accessible by the processing platform;

causing, by the processing platform, a first prompt to be displayed at the merchant, wherein the first prompt queries whether to enroll in the loyalty program to thereby create a loyalty program account when the first identification information is not associated with any loyalty program accounts;

receiving, by the one or more physical processors, a response to the first prompt comprising an indication to proceed with an enrollment to create the loyalty program, account;

storing, by the processing platform, an association of the first identification information and the loyalty program account in a customer record in response to the indication to proceed with the enrollment;

causing, by the processing platform, a second prompt that queries whether additional payment devices are to be associated with the loyalty program account;

receiving, by the processing platform, at least second identification information that identifies a second payment device that is to be associated with the loyalty program account;

storing, by the processing platform, an association of the second identification information and the loyalty program account in the customer record, wherein the loyalty program account is subsequently identifiable based on a use of the first payment device and/or the second payment device to pay for a given transaction; and transmitting, by the processing platform, a confirmation message indicating that the enrollment was successful.

10. The method of claim 9, further comprising:
receiving, by the processing platform, a total amount for the transaction;
identifying, by the processing platform, a discount to be applied to the transaction based on the loyalty program account;
causing, by the processing platform, the discount to be applied to the transaction to produce an adjusted amount due;
generating, by the processing platform, a payment request based on the adjusted amount due; and
transmitting, by the processing platform, the payment request to a payment processing service.

11. The method of claim 9, further comprising:
receiving, by the one or more processors, an identification of a mobile device;
associating, by the one or more processors, the identification of the mobile device with the first identification information or the single loyalty program account; and
transmitting, by the processing platform, a message comprising information related to the single loyalty program account to the mobile device.

12. The method of claim 11, further comprising:
communicating, by the processing platform, a request to confirm a desire to enroll in the loyalty program to the mobile device using the identification of the mobile device;
receiving, by the processing platform, a confirmation of the desire to enroll from the mobile device; and
updating, by the processing platform, the customer record to indicate the confirmation of the desire to enroll.

13. The method of claim 12, wherein the confirmation of the desire to enroll is received via a Short Message Service (SMS) message.

14. The method of claim 12, wherein the confirmation of the desire to enroll is received via a log in to a website associated with the loyalty program.

15. The method of claim 11, wherein transmitting the message to the mobile device comprises:
sending, by the processing platform, a Short Message Service (SMS) message to the mobile device.

16. The method of claim 9, wherein the first payment device comprises a credit card or a mobile device.

17. A processing platform for of identifying a single loyalty program account of a user when the user uses one of a plurality of credit card numbers to pay for transactions at a retailer that provides discounts to the user through the single loyalty program account, the processing platform comprising:

a memory configured to store an association of a single loyalty program account that is related to a user and a plurality of credit card numbers that are related to the user, wherein the single loyalty program account is identifiable based on a use of any one of the plurality of credit card numbers, wherein the plurality of credit card numbers comprise a first credit card number that identifies a first credit card account of the user and a second credit card number that identifies a second credit card account of the user;

one or more physical processors programmed with one or more computer program instructions to:
receive the first credit card number in association with a first transaction
identify the single loyalty program account based on the first credit card number;
identify a first discount to be applied to the first transaction based on the single loyalty program account; and
cause the first discount to be applied to the first transaction;
receive the second credit card number in association with a second transaction different from the first transaction;
identify the single loyalty program account based on the second credit card number;
identify a second discount to be applied to the second transaction based on the single loyalty program account; and
cause the second discount to be applied to the second transaction.

18. The processing platform of claim 17, wherein the processing platform is further programmed to:

receive a total amount due for the first transaction;
determine an adjusted amount due based on the total amount due for the transaction and the first discount; and
transmit the adjusted amount due and identifying information that identifies the first credit card number to a payment processing service for payment using the credit card account.

19. The processing platform of claim 17, wherein the one or more processors are further configured to:
determine a mobile device associated with the first credit card number; and
transmit a message associated with the single loyalty program account to the mobile device.

20. A system for facilitating use of a loyalty program, wherein a plurality of credit card numbers are associated with a single loyalty program account, the system comprising:
at least one point of sale computer system programmed to process payment transactions; and
a processing platform, the processing platform comprising:
a memory configured to store an association of a single loyalty program account that is related to a user and a plurality of credit card numbers that are related to the user, wherein the single loyalty program account is identifiable based on a use of any one of the plurality of credit card numbers, wherein the plurality of credit card numbers comprise a first credit card number that identifies a first credit card account of the user and a second credit card number that identifies a second credit card account of the user;
one or more physical processors programmed with one or more computer program instructions to:
receive, from the at least one point of sale computer system, a first credit card number in association with a first transaction;
identify the single loyalty program account based on the first credit card number;
identify a first discount to be applied to the first transaction based on the single loyalty program account;
calculate an adjusted amount due based on the first discount;
generate a first payment request in a standard format used by a payment processing service, the payment request comprising the adjusted amount due to be paid using the first credit card account; and
transmit the first payment request to the payment processing service;
receive, from the at least one point of sale computer system, a second credit card number in association with a second transaction different from the first transaction;
identify the single loyalty program account based on the second credit card number;
identify a second discount to be applied to the second transaction based on the single loyalty program account;
calculate a second adjusted amount due based on the second discount;
generate a second payment request in the standard format used by the payment processing service, the payment request comprising the second adjusted amount due to be paid using the second credit card account; and
transmit the second payment request to the payment processing service.

21. A method of identifying a single loyalty program, account of a user when the user uses one of a plurality of credit card numbers to pay for transactions at a retailer that provides discounts to the user through the single loyalty program account, the method being implemented by a processing platform having one or more physical processors programmed by one or more instructions to perform the method, the method comprising:
causing, by the processing platform, an association of a single loyalty program account that is related to the user and a plurality of credit card numbers that are related to the user to be stored such that the single loyalty program account is identifiable based on a use of any one of the plurality of credit card numbers, wherein the plurality of credit card numbers comprise a first credit card number that identifies a first credit card account of the user and a second credit card number that identifies a second credit card account of the user;
receiving, by the processing platform, from a retailer, a first payment device identification that identifies a first credit card number of a first credit card account used to pay for a first transaction,
wherein the first credit card number is issued by a first issuing financial institution—and is to be transmitted by the retailer or the processing platform in a standard format used by a payment processing service to debit the first credit card account at the first issuing financial institution;
identifying, by the processing platform, the single loyalty program account based on the first payment device identification;
identifying, by the processing platform, a first promotion based on the single loyalty program account;
communicating, by the processing platform, the first promotion;
receiving, by the processing platform, from the retailer, a second payment device identification that identifies a second credit card number of a second credit card account used to pay for a second transaction different from the first transaction,
wherein the second credit card number is issued by a second issuing financial institution and is to be transmitted by the retailer or the processing platform in the standard format used by the payment processing service to debit the second credit card account at the second issuing financial institution;
identifying, by the processing platform, the single loyalty program account based on the second payment device identification;
identifying, by the processing platform, a second promotion based on the single loyalty program account; and
communicating, by the processing platform, the second promotion.

22. The method of claim 21, wherein the first promotion comprises a discount to be applied to the first transaction, the method further comprising:
causing, by the processing platform, the discount to be applied to the transaction.

23. The method claim 22, the method further comprising:
receiving, by the processing platform, a total amount due for the first transaction, wherein causing the discount to be applied to the first transaction comprises:
determining, by the processing platform, an adjusted amount due based on the total amount due and the discount; and
communicating, by the processing platform, the adjusted amount due and information identifying the first payment account to a payment processor for payment using the first payment account.

24. The method claim 22, wherein causing the discount to be applied to the transaction comprises:
   communicating, by the processing platform, the discount to the retailer associated with the first transaction, wherein the retailer submits a request to a third party payment processor for processing the payment based on the discount.

25. The method of claim 21, further comprising:
   determining, by the processing platform, a mobile device associated with the first payment device identification; and
   communicating, by the processing platform, the first promotion to the mobile device.

26. The method of claim 25, wherein communicating the first promotion to the mobile device comprises:
   causing, by the processing platform, a Short Message Service text message comprising the first promotion to be sent to the mobile device.

27. The method of claim 21, wherein communicating the promotion to the mobile device comprises:
   causing, by the processing platform, a point of sale terminal related to the first transaction to print the promotion, wherein the promotion comprises a message that includes a number of purchases needed to receive an award, a notification of a future promotion, or a message that encourages joining loyalty program.

28. The method of claim 27, wherein the first promotion comprises a message that includes a number of purchases needed to receive an award.

29. The method of claim 27, wherein the first promotion comprises a notification of a future promotion.

30. The method of claim 27, wherein the first promotion comprises a message that encourages joining a loyalty program.

31. The method of claim 21, wherein the first promotion comprises a coupon and wherein communicating the first promotion to the mobile device comprises:
   causing, by the processing platform, the point of sale terminal to print the promotion in association with a receipt.

32. The method of claim 21, wherein the first payment device identification is associated with a payment card or a mobile device.

33. The method of claim 21, wherein the loyalty program is not offered by the issuing financial institution.

* * * * *